3,447,201
AUTOMATIC PLASTIC MIXING APPARATUS
Rex C. Seanor, Akron, Ohio, and S. Everett Perlberg, Fairlawn, N.J., assignors to Adamson United Company, Akron, Ohio, a corporation of Ohio
Filed Dec. 19, 1966, Ser. No. 602,767
Int. Cl. B29h 1/10
U.S. Cl. 18—2        7 Claims

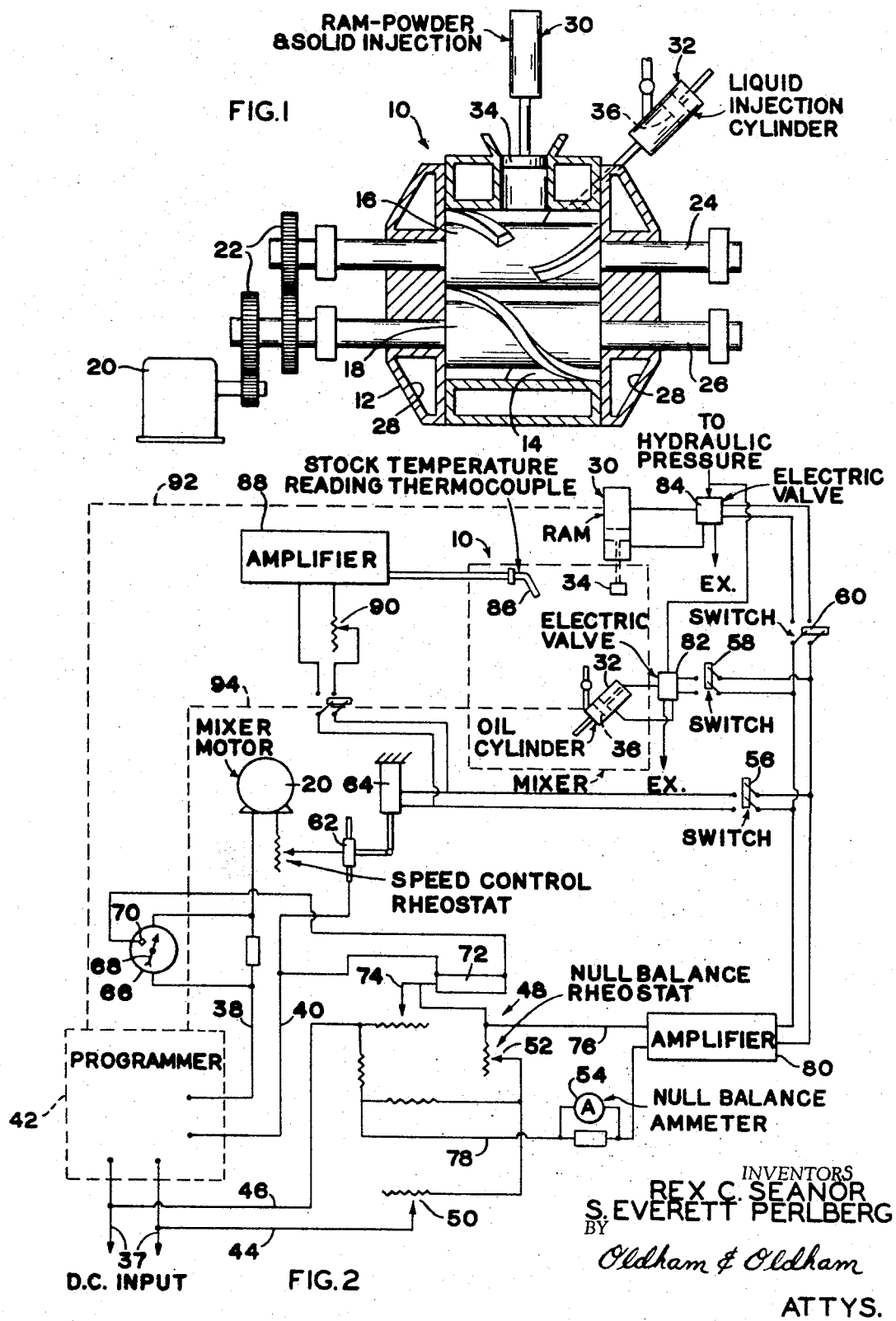

ABSTRACT OF THE DISCLOSURE

A combination and mixing apparatus for elastomeric materials is provided and includes a housing defining a mixing chamber in which a rotary type mixing means is positioned. A variable speed motor is provided for the mixing means and other means are present to detect a change in motor torque. The apparatus includes means responsive to the torque detecting means and to the temperature sensing means for the plastic to change the speed of the drive motor.

---

This invention relates to apparatus for automatically mixing elastomeric materials, such as rubber, plastic, or the like.

It has been found in the operation of mixing and plasticizing rubber compounds, or the like, that it is desirable to vary the speed of the mixer during a mixing cycle. For example, running the mixer at relatively fast speeds at the beginning of the mixing cycle builds up heat quickly which helps plasticize the mass being mixed. This allows certain additives such as oils, solids, softeners, etc., to be added to the plasticized mass in order to form the compound. Also, slowing the mixing speed down at a selected time and in a selected amount will equalize the heat developed by the mixing action with the heat withdrawal effected by cooling water utilized in the mixer jacket and rotors so as to keep constant the temperature of the stock.

It also has been discovered that as the stock is being plasticized by the mixing operation, certain changes in the torque of the mixer motor and of the stock temperature occur. In accord with the present invention, these torque changes are utilized to determine the precise time at which certain additives are added to the compound in order to achieve the most desirable results.

It is the general object of the present invention to provide a plastic mixing apparatus which automatically detects and utilizes changes in motor torque of the mixer apparatus and/or stock temperature, and which automatically utilizes such changes to effect the introduction of additives to the compound, and/or to automatically change the speed of the mixing motor.

It is a further object of the invention to control the viscosity of the material being mixed and to permit quality and viscosity readings as a quality standard without the need for separate sampling from the mixed materials.

For a better understanding of the invention, reference should be had to the following drawings wherein:

FIG. 1 is a diagrammatic, vertical cross sectional view of a typical mixing apparatus utilized in the invention;

FIG. 2 is a schematic view of the control circuits employed with the apparatus of FIG. 1.

Referring to the drawings in greater detail, and with particular reference to FIG. 1, the numeral 10 generally indicates a typical internal intensive mixer for elastomers such as natural or synthetic rubber, plastic, and the like. The mixer 10 basically consists of a housing 12 which defines a mixing chamber 14 which receives the stock to be mixed. A pair of cooperating rotors 16 and 18 are positioned for rotatable movement in the mixing chamber 14 and a variable speed motor 20, acting through suitable gears 22 and drive shafts 24 and 26, effects a rotation of rotors 16 and 18 in the mixing chamber. The mixing and blending of the compounds introduced into the mixing chamber 14 is done by kneading the batch between the rotors 16 and 18 and against the chamber walls. Cooling chambers 28 are provided in the housing 12, and often in the rotors 16 and 18 as well, and cooling water is adapted to circulate therethrough in order to keep the stock from scorching while the stock is being masticated, or fluxed.

As mentioned hereinbefore, at predetermined times of the mixing operation, it is necessary to add certain additives to the mixing compound, such as oils, solids, softeners, etc. In order to accomplish this purpose, a ram 30 and a liquid injection cylinder 32 are operatively connected to the mixing chamber 14. The ram 30 has a hydraulic powered piston 34 which, when actuated, pushes any solid additives into the mixing chamber. Liquid injections cylinder 32 also consists of a hydraulic powered piston 36 which is adapted to inject liquid additives such as oil into the mixing chamber.

A feature of the present invention is to provide mechanism whereby the ram 30 and the liquid injection cylinder 32 are actuated automatically to inject additives into the mixing chamber at the proper time sequence in the mixing cycle. Also, since it is often desirable to maintain the stock temperature constant to provide most effective mixing, as well as prevent scorching, another feature of the present invention is to provide apparatus for automatically changing or maintaining the speed of mixing motor 20 at an automatically selected time, for example, at the same time additives are injected into the mixing chamber 14 by the ram 30 and the liquid injection cylinder 32.

Referring to FIG. 2, this figure illustrates the control circuit utilized to effect the automatic action of the mixer apparatus. Specifically, the mixer motor 20 is powered by a direct current input 37 or slip coupling through leads 38 and 40 from a programmer 42. At the same time, current is directed by input leads 44 and 46 to a Wheatstone bridge circuit, generally indicated by the numeral 48. A manually controlled rheostat 50 in the lead 44 is provided so that a relatively small input current is directed to Wheatstone bridge circuit 48.

Upon actuation of the mixing cycle as current is fed into the programmer 42 and to the mixer motor 20, a null balance rheostat 52 is manually adjusted so that the Wheatstone bridge circuit 48 is brought into balance. The operator, by adjusting rheostat 52 until a null balance ammeter 54 in the output of the bridge registers zero, can make sure that the Wheatstone bridge is in balance. The output of the bridge 48 passes to an amplifier 80. Switches 56, 58 and 60 positioned in the output circuit of the amplifier are open at this time since a small current will pass to amplifier 80 and on to the actuation circuitry of the mixer apparatus until the null balance rheostat is adjusted to bring the Wheatstone bridge 48 into balance. As soon as the operator, by adjusting null balance rheostat 52 does bring the bridge 48 into balance, switches 56, 58 and 60 are closed.

As mentioned hereinbefore, the torque output of the mixer motor 20 varies in a predetermined fashion in a standard mixing cycle. It is, therefore, the purpose of the circuitry illustrated in FIG. 2 to automatically actuate ram 30 and oil cylinder 32 and to change the speed of mixer motor 20 in accordance with designated indications of change in stock temperature or in torque output of the mixer motor 20. In order to accomplish this desired result, a speed control rheostat 62 operatively affixed to a spring tensioned solenoid 64 is utilized to change the speed of the mixer motor 20.

A contact point ammeter 66 is utilized to read the amount of current flow to the mixer motor 20. The contact point ammeter 66 is adapted to remain open as long as at least a certain amount of current is drawn by the mixer motor 20. When, however, the current requirements of the mixer motor 20 drop below a preset level of measurement, the arm 68 on ammeter 66 contacts the arcuately adjustable contact point 70 so that an electric current passes to a spring tensioned solenoid 72. Actuation of the solenoid 72 effects movement of a bridge balance rheostat 74 which is operatively connected to the solenoid 72. Movement of bridge balance rheostat 74 effects a change of resistance on one of the legs of the Wheatstone bridge 48 whereby the bridge is thrown out of balance. As the unbalancing occurs, current is directed through leads 76 and 78 to amplifier 80. At this time the null balance ammeter 54 again registers a current flow.

Since switch 56 is now closed, the amplifier 80 passes a current to solenoid 64 with the actuation of solenoid 64 causing a repositioning of speed control rheostat 62 to thereby effect a change in motor speed of the mixer motor 20. At the same time, if by choice, switch 58 has been closed, current is directed to an electrically actuated valve 82 which is operated to effect actuation of piston 36 in liquid injection cylinder 32 so that liquid additives are injected into the mixing chamber 14. If, by choice, switch 60 has also been closed, an electric current is passed to electrically actuated valve 84 which is operated to effect actuation of ram 30 so that piston 34 pushes any powder or solid additives into the mixing chamber 14.

It should be noted here that any or all of switches 56, 58 and 60 can be left open so that the change in torque on the mixing motor can effect any selected one, two, or all three of the functions of change of motor speed, adding of powders, and/or of liquids to the mix.

Should the addition of additives cause the mixing stock to become more viscous, more current will be required by mixer motor 20 so that needle 68 of ammeter 66 may once again register above the preset level of bridge balance rheostat 74 back to its original position to once again bring bridge 48 into balance.

Instead of having an arcuately adjustable contact 70 in ammeter 66 it is possible to provide an arcuately shaped resistance contact or contacts 70 over which the needle 68 can move to supply a variable voltage to solenoid 72. This provides a variable voltage control to motor 20 to provide a wide variety of motor speeds instead of only the several provided by a single contact 70.

It is also possible to control the actuation of ram 30 and liquid injection cylinder 32, and the speed of mixer motor 20 in accordance with changes in the temperature of the mixing stock instead of or as well as changes in torque requirements of the mixer motor 20. This is accomplished by use of a stock temperature reading thermocouple 86 positioned in the mixing stock and pass it in terms of electric current to an amplifier 88. The output from the amplifier passes through a temperature control rheostat 90 to solenoid 64 after the temperature of the stock in the mixing chamber rises above a predetermined point. This is accomplished by simply manually moving the temperature control rheostat 90 to a selected point whereby no signal operative current is directed to the solenoid 64 until after the stock temperature hits a certain level. When such occurs, solenoid 64 is actuated to change the position of speed control rheostat 62 to effect a change in the speed of mixer motor 20. At the same time a signal is sent to solenoid 64, a signal may be sent, by selectively closing switches 56, 58 and/or 60 from the amplifier 88 to valves 82 and 84 to effect operation of ram 30 and liquid injection cylinder 32.

It should be also noted that the mixing apparatus of the invention is readily adaptable to be controlled completely by the programmer 42. For example, lead 92 from the programmer to the ram 30 and lead 94 from the programmer to the liquid injection cylinder 32 allow the programmer to control the actuation of these units, and also the motor 20, independently from any signals from the stock temperature reading thermocouple 86 or the ammeter 66. The programmer, of known type, usually employs a card or tape to control the entire mixing cycle. The apparatus of the present invention can be used without the programmer, but normally is employed in addition to the programmer to provide overriding additive functions.

One of the advantages of controlling the speed of motor 20 from the temperature of the stock, all as just described, is that the motor speed is automatically increased or decreased by increments to keep the stock at a constant temperature, as the temperature thereof decreases, or increases, respecively. In other words, the heat generated during mixing is a function of motor speed, so that by changing motor speed the generated heat can be kept equal to the heat withdrawn by radiation and by the cooling water circulated through the mixer. And constant stock temperature can be maintained even upon the addition of dry or liquid additives. Thus, the mixer can be operated at temperatures keeping the stock as hot and soft as possible.

It should be noted that a suitable recording and/or visual motor torque indicator, operated by the current flow, can be provided in lead 38. Hence, by sampling a mix of stock at regular intervals as the mixing thereof progresses and determining the viscosity of such samples, standards for reading the viscosity of such particular mix by the motor torque can be established. Hence in processing other batches of the same stock, the viscosity of the stock can be determined by the motor torque.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in mixing apparatus for elastomeric materials including rubber and plastics, of:
   a housing defining a mixing chamber,
   rotor mixing means in the chamber,
   a variable speed motor driving the mixing means,
   means for detecting a change in motor torque,
   means responsive to the torque detecting means to change the speed of the motor,
   means for detecting a change in temperature of the plastic in the mixing chamber, and
   means responsive to said temperature detecting means to change the speed of the motor.

2. The combination according to claim 1 wherein said means responsive to said temperature detecting means and said means responsive to said torque detecting means are one and the same means, but the effect thereon of the temperature detecting means and the torque detecting means is algebraically additive.

3. The combination according to claim 2 wherein said responisve means consist of a solenoid adapted to receive a signal from said torque detecting means and said temperature detecting means, and a motor speed control rheostat operatively connected to said solenoid whereby the speed of said mixing motor is changed when the solenoid is actuated.

4. The combination according to claim 1 and including:
   ram means for injecting powder and solid additives into the mixing chamber, and
   means responsive to said torque detecting means to actuate said ram means whereby said additives are injected into the mixing chamber.

5. The combination according to claim 1 and including hydraulic means for injecting liquid additives into the mixing chamber, and means responsive to said torque detecting means to actuate said hydraulic means.

6. The combination according to claim 1 and including means for injecting additives into the mixing chamber, and means responsive to said torque detecting means to actuate said injecting means.

7. The combination according to claim 1 wherein said means for detecting a change in motor torque include:
a contact point ammeter measuring torque requirements of said motor,
solenoid means adapted to receive an electric current from said ammeter when the torque of said motor drops below a preset level of measurement,
a bridge balance rheostat operatively connected to said solenoid means,
a Wheatstone bridge connected to said responsive means and normally operating under balance conditions whereby the potential drop to the responsive means is zero but whereby actuation of said solenoid means effects movement of the bridge balance rheostat causing an unbalance of the bridge whereby a signal is sent to said responsive means.

References Cited

UNITED STATES PATENTS

| | | |
|---|---|---|
| 1,879,367 | 9/1932 | Lotz. |
| 2,340,673 | 2/1944 | Lotz et al. _____ 25—14 |
| 2,747,224 | 5/1956 | Koch et al. |
| 3,111,707 | 11/1963 | Buckley. |
| 3,212,133 | 10/1965 | Heidrich. |
| 3,259,940 | 7/1966 | Kovach et al. |
| 3,286,302 | 11/1966 | Doering. |
| 3,339,227 | 9/1967 | Ehrenfreund. |

FOREIGN PATENTS 699,683  12/1964  Canada.

WILLIAM J. STEPHENSON, *Primary Examiner.*